(12) United States Patent
Lin et al.

(10) Patent No.: US 9,740,367 B2
(45) Date of Patent: Aug. 22, 2017

(54) TOUCH-BASED INTERACTION METHOD

(71) Applicant: Coretronic Corporation, Hsin-Chu (TW)

(72) Inventors: Chi-Wei Lin, Hsin-Chu (TW); Jui-Chi Chen, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 0 days.

(21) Appl. No.: 15/096,078

(22) Filed: Apr. 11, 2016

(65) Prior Publication Data

US 2017/0003854 A1 Jan. 5, 2017

(30) Foreign Application Priority Data

Jun. 30, 2015 (CN) .......................... 2015 1 0371826

(51) Int. Cl.
*G06F 3/0481* (2013.01)
*G06F 3/0488* (2013.01)
*G06F 3/0482* (2013.01)

(52) U.S. Cl.
CPC ........ *G06F 3/04817* (2013.01); *G06F 3/0482* (2013.01); *G06F 3/04883* (2013.01)

(58) Field of Classification Search
CPC .. G06F 3/0481; G06F 3/04817; G06F 3/0482; G06F 3/0488; G06F 3/04883; G06F 3/0484; G06F 3/04842; G06F 2203/04803
See application file for complete search history.

(56) References Cited

U.S. PATENT DOCUMENTS

| | | | |
|---|---|---|---|
| 5,119,079 A * | 6/1992 | Hube | G03G 15/5016 345/173 |
| 8,245,156 B2 | 8/2012 | Mouilleseaux et al. | |
| 8,300,017 B2 * | 10/2012 | Kim | G06F 3/0485 345/173 |
| 8,712,392 B2 * | 4/2014 | Kim | G06F 3/04883 345/173 |
| 9,395,913 B2 * | 7/2016 | Lim | G06F 3/0488 |
| 2008/0163119 A1 * | 7/2008 | Kim | G06F 3/04886 715/840 |
| 2010/0127847 A1 * | 5/2010 | Evans | G06F 3/04817 340/461 |

(Continued)

FOREIGN PATENT DOCUMENTS

CN 201984452 U 9/2011
CN 103931176 A 7/2014

*Primary Examiner* — Tom Sheng
(74) *Attorney, Agent, or Firm* — Li-Jen Shen

(57) ABSTRACT

A touch-based interaction method includes the steps of: detecting a first ending touch point signal generated when a user at a first location touches a first ending touch point on a touch screen; upon detection of a disappearance of the first ending touch point signal, displaying a shortcut icon on a first area on the touch screen, wherein the first area is an area on the touch screen touched by the user locating at the first location; upon the user touching the shortcut icon, hiding the shortcut icon from the touch screen and displaying a menu interface on the touch screen, wherein the menu interface is located in the first area; detecting a close menu touch point signal generated when the user touches the touch screen outside of the menu interface; and upon detection of the close menu touch point signal, hiding the menu interface from the touch screen.

12 Claims, 6 Drawing Sheets

(56) References Cited

U.S. PATENT DOCUMENTS

| | | | |
|---|---|---|---|
| 2010/0146451 A1* | 6/2010 | Jun-Dong | G06F 3/0482 715/841 |
| 2010/0162108 A1* | 6/2010 | Stallings | G06F 3/04817 715/702 |
| 2010/0211913 A1* | 8/2010 | Chen | H04N 5/44543 715/810 |
| 2011/0164063 A1* | 7/2011 | Shimotani | G06F 3/0416 345/661 |
| 2012/0032979 A1* | 2/2012 | Blow | G06F 1/1626 345/647 |
| 2012/0176308 A1 | 7/2012 | Westermann et al. | |
| 2013/0088450 A1* | 4/2013 | Takase | G06F 3/0485 345/173 |
| 2014/0115540 A1* | 4/2014 | Ikeda | G06F 3/0488 715/835 |

\* cited by examiner

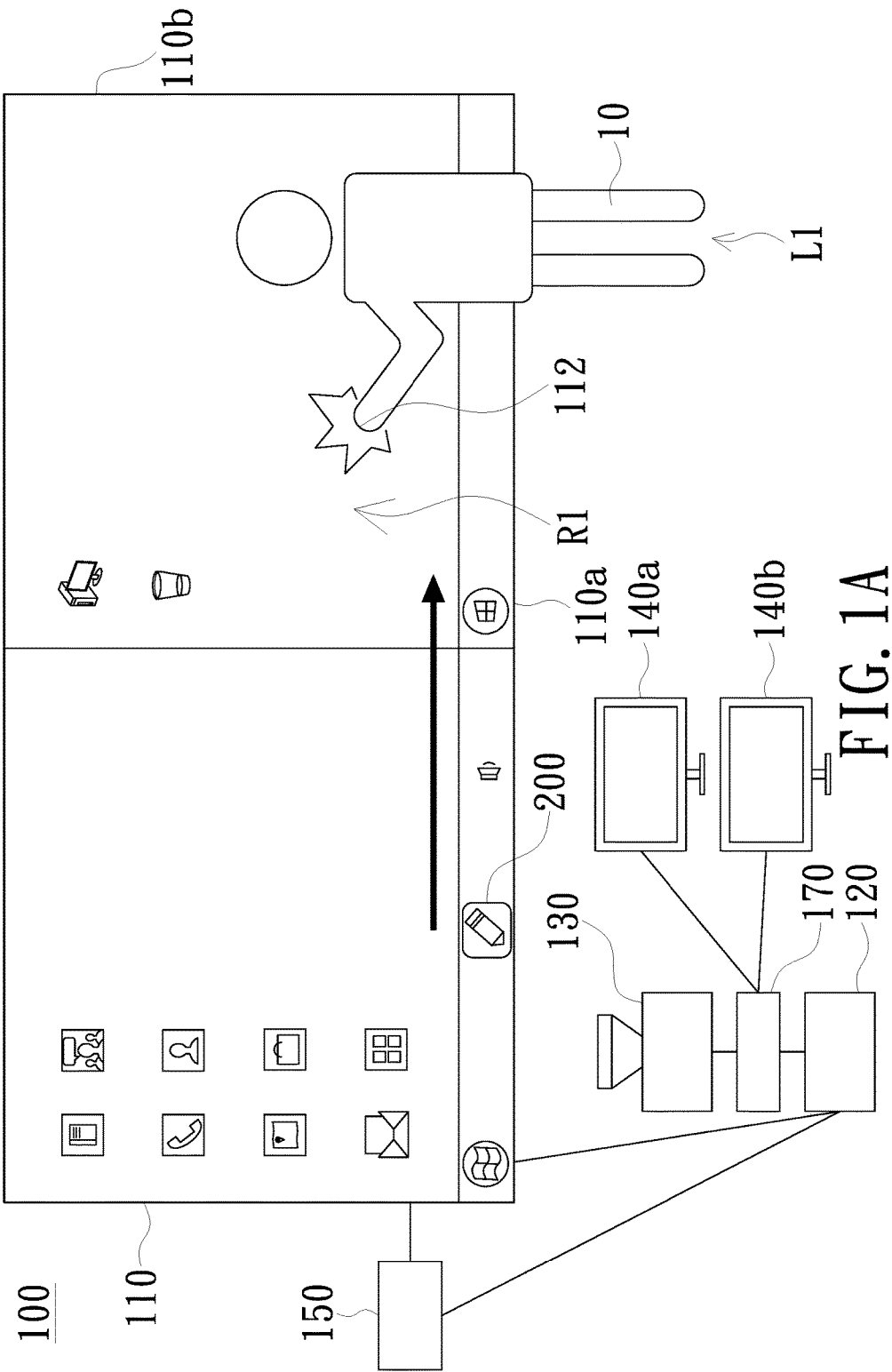

TOUCH-BASED INTERACTION METHOD

FIELD OF THE INVENTION

The invention relates to a method of interaction, and more particularly to a touch-based interaction method.

BACKGROUND OF THE INVENTION

As technology advances, touch-based interaction methods have been extensively applied to a wide array of electronic display devices.

Interactive electronic whiteboard is an example of the application of touch-based interaction methods on electronic display devices. Interactive electronic whiteboards utilize bidirectional interaction and operation between the whiteboard and a computer. Existing electronic whiteboards are used in conjunction with computers and projectors; their user-friendly interfaces allow users to operate various applications by using a finger or a touch stylus pen and to make or save presentations by drawing, writing, and saving comments and annotations on the electronic whiteboards.

In general, an operational interface of a conventional electronic whiteboard is fixed to a defined location for users to tap and activate the corresponding functions. However, electronic whiteboards usually have a wide side, allowing the users to display multiple images simultaneously. Consequently, when a user standing away from the operational interface desires to activate functions at the operational interface, the user would need to walk back and forth to access specific menu options contained in the operational interface; under certain circumstances, part of the operational interface may even become inaccessible to the user.

Additionally, most fixed operational interfaces have to be set outside of the screen and occupy minimal spaces so as not to obstruct the view of the contents displayed in the screen. Consequently, hitting a wrong button or unable to access certain functions may occur during operation of a touch-based operational interface.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention was acknowledged by a person of ordinary skill in the art.

SUMMARY OF THE INVENTION

One of the objectives of the invention is to provide a touch-based interactive method, so as to provide a solution to the existing technical challenges.

Other objectives and advantages of the invention may be further comprehended through the technical features disclosed herein.

To achieve the aforementioned objectives, an embodiment of the invention provides a touch-based interaction method, including the steps as follows: detecting a first ending touch point signal generated when a user at a first location touches a first ending touch point on a touch screen; upon detection of a disappearance of the first ending touch point signal, displaying a shortcut icon on a first area on the touch screen, wherein the first area is an area on the touch screen touched by the user locating at the first location; upon the user touching the shortcut icon, hiding the shortcut icon from the touch screen and displaying a menu interface on the touch screen, wherein the menu interface is located in the first area; detecting a close menu touch point signal generated when the user touches the touch screen outside of the menu interface; and upon detection of the close menu touch point signal, hiding the menu interface from the touch screen.

The touch-based interaction method of the embodiments of the invention enables the user to operate the shortcut icon by touching the touch screen and thus activate the menu interface conveniently from any location around the touch screen, providing excellent convenience during interactive operations of the touch screen.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The invention will become more readily apparent to those ordinarily skilled in the art after reviewing the following detailed description and accompanying drawings, in which:

FIGS. 1A-1E are schematic views illustrating steps of a touch-based interaction method according to an embodiment of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component.

Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1B:
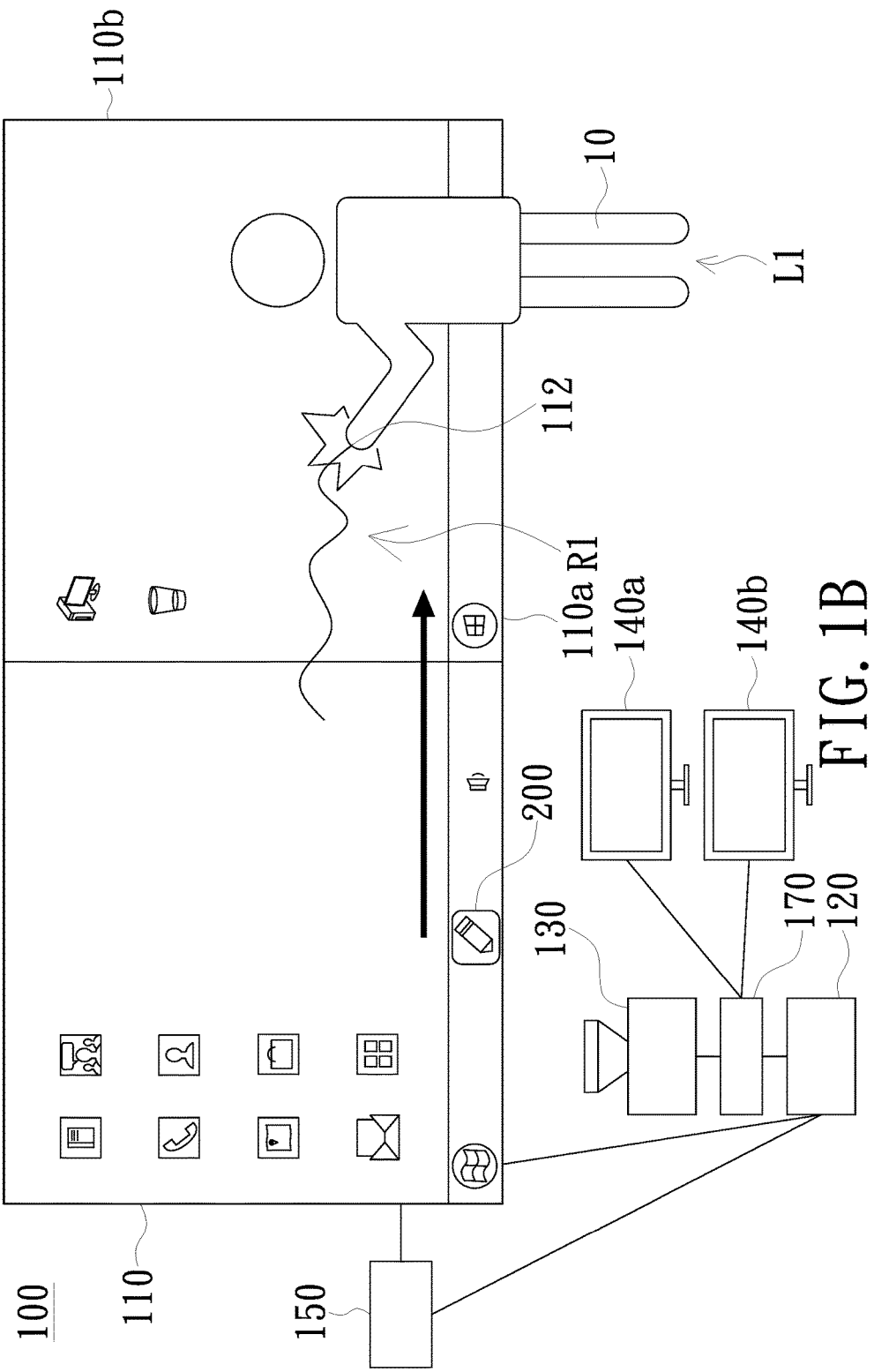

Referring to FIGS. 1A-1E, FIGS. 1A-1E are schematic views illustrating steps of a touch-based interaction method according to an embodiment of the invention. As shown in FIG. 1A, the touch-based interaction method of the embodiment can be implemented on a touch-based interaction device 100. In this embodiment, the touch-based interaction device 100 includes a touch screen 110 and a processing unit 120 electrically connected to the touch screen 110. The touch screen 110 may be an electronic whiteboard. The processing unit 120 may be, but not limited to, a computing device, a central processing unit (CPU), a microprocessor or other programmable microprocessors, a digital signal processor (DSP), a programmable controller, an application specific integrated circuits (ASIC), a programmable logic device (PLD) or other equivalent devices. On the other hand, in some embodiments, the touch-based interaction device 100 may further include a projection device 130 for projecting an image on the touch screen 110 from at least one image source. In the embodiments illustrated in FIGS. 1A-1E, the touch-based interaction device 100 includes two image sources 140a and 140b and an image superimposing unit 170. The image superimposing unit 170 is electrically connected to the image sources 140a and 140b, the projection device 130, and the processing unit 120. The image superimposing unit 170 is configured to receive image signals from the image sources 140a/140b and superimpose the received image signals to form a superimposed image signal. The superimposed image signal is sent to the projection device 130 from the image superimposing unit 170, and the projection device 130 projects images corresponding to the superimposed image signal onto the touch screen 110. In other embodiments, the image superimposing unit 170 is optional if the touch-based interaction device 100 include only one of the image source 140a and the image source 140b. The image sources 140a or the image source 140b may be electrically connected to the projection device 130 directly to provide image signals to the projection device 130. More specifically, a user 10 may control the image source 140a and the image source 140b, thus the images displayed on the touch screen 110, by tapping images projected by the projection device 130 onto the touch screen 110. For example, the image source 140a or 140b may be, but not limited to, a computing device, a smart phone, a tablet computer, a server system, a camera, an audio video device, or other image display devices.

More specifically, the touch-based interaction device 100 may include a detection unit 150. The detection unit 150 is electrically connected to the touch screen 110 and the processing unit 120. The detection unit 150 may detect a first ending touch point signal generated when the user 10 at a first location L1 touches a first ending touch point 112 on the touch screen 110, and send the first ending touch point signal to the processing unit 120. In this embodiment, the sensing area formed by the detection unit 150 on the touch screen 110 may, but may not be limited to, superimpose with the image projected by the projection device 130 on the touch screen 110. More specifically, the first location L1 may be, but not limited to, the position where the user 10 stands when the user 10 touches the sensing area on the touch screen 110 with a finger or an object operated by the user 10.

Additionally, the first ending touch point 112 is the last touch point that the user 10 touches on the sensing area of the touch screen 110 with a finger or an object operated by the user 10. Referring to the embodiment illustrated in FIG. 1B, several connecting touch points are generated when the user 10 at the first location L1 touching the touch screen 110 continuously (such as drawing a line on the touch screen 110). The last one of the connecting touch points is defined as the first ending touch point 112.

On the other hand, the first ending touch point signal generated by the detection unit 150 may be a spatial information regarding the first ending touch point 112. That is, the first ending touch point signal may, but may not limited to, define a x-coordinate value and a y-coordinate value of the first ending touch point 112. It is noted that the object in this embodiment may be, but not limited to, a touch stylus pen.

It is noted that location and structure of the processing unit 120, the projection device 130, the image source 140a and the image source 140b, the detection unit 150, and the image superimposing unit 170 of the embodiment are merely exemplary, and shall not be construed as limiting the scope of the invention. In the embodiment illustrated in FIGS. 1A-1E, the image superimposing unit 170 may be, but not limited to, an independent device such as an image superimposer. In other embodiments, the image superimposing unit 170 may be, but not limited to, integrated into the projection device 130 or the processing unit 120. Additionally, in the embodiment illustrated in FIGS. 1A-1E, the detection unit 150 may be, but not limited to, an independent device. In other embodiments, the detection unit 150 may be built into the touch screen 110. Furthermore, in other embodiments, the touch screen 110 may be a projection screen or a surface used in conjunction with an invisible light generating device (not shown) to form an invisible light curtain above the screen, such that the detection unit 150 may act as an independent invisible light sensor and connect with the projection device 130 or be built in to the invisible light sensor of the projection device 130. Touch points formed by invisible light signals generated by the user 10 touching the screen are then detected by a camera, so that the coordinate values of the touch points are defined.

Figure 1C:
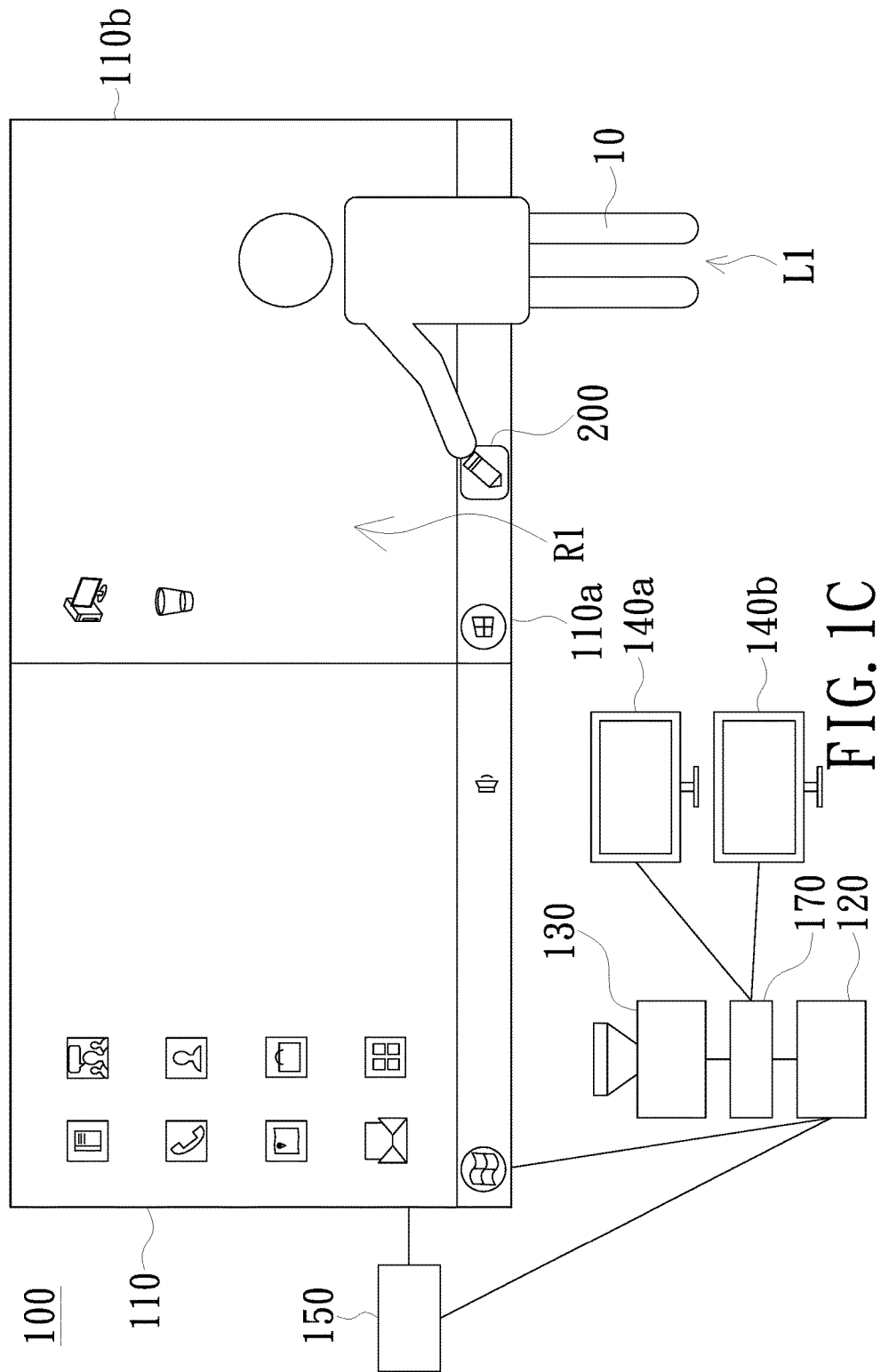

Referring now to FIG. 1C, upon the detection unit 150 detecting the disappearance of the first ending touch point signal, a shortcut icon 200 is displayed on a first area R1 on the touch screen 110. It is to be understood that the first area R1 is the area on the touch screen 110 touched by the user 10 at the first location L1 with a finger or an object operated by the user 10; that is, the shortcut icon 200 would be located within the sensing area of the touch screen 110 touched by the user locating at the first location L1 with a finger or an object operated by the user 10.

For example, upon the detection unit 150 detecting the disappearance of the first ending touch point signal, the processing unit 120 would analyze the spatial information of the first ending touch point signal. The spatial information may be the coordinate values of the first ending touch point 112 relative to a reference point on the touch screen 110; that is, the x-coordinate and y-coordinate of the first ending touch point 112 defined with respect to the reference point. The x-axis may be parallel to a long side 110a of the touch screen 110 and the y-axis may be parallel to a short side 110b of the touch screen; however, the invention is not limited thereto.

Figure 1D:
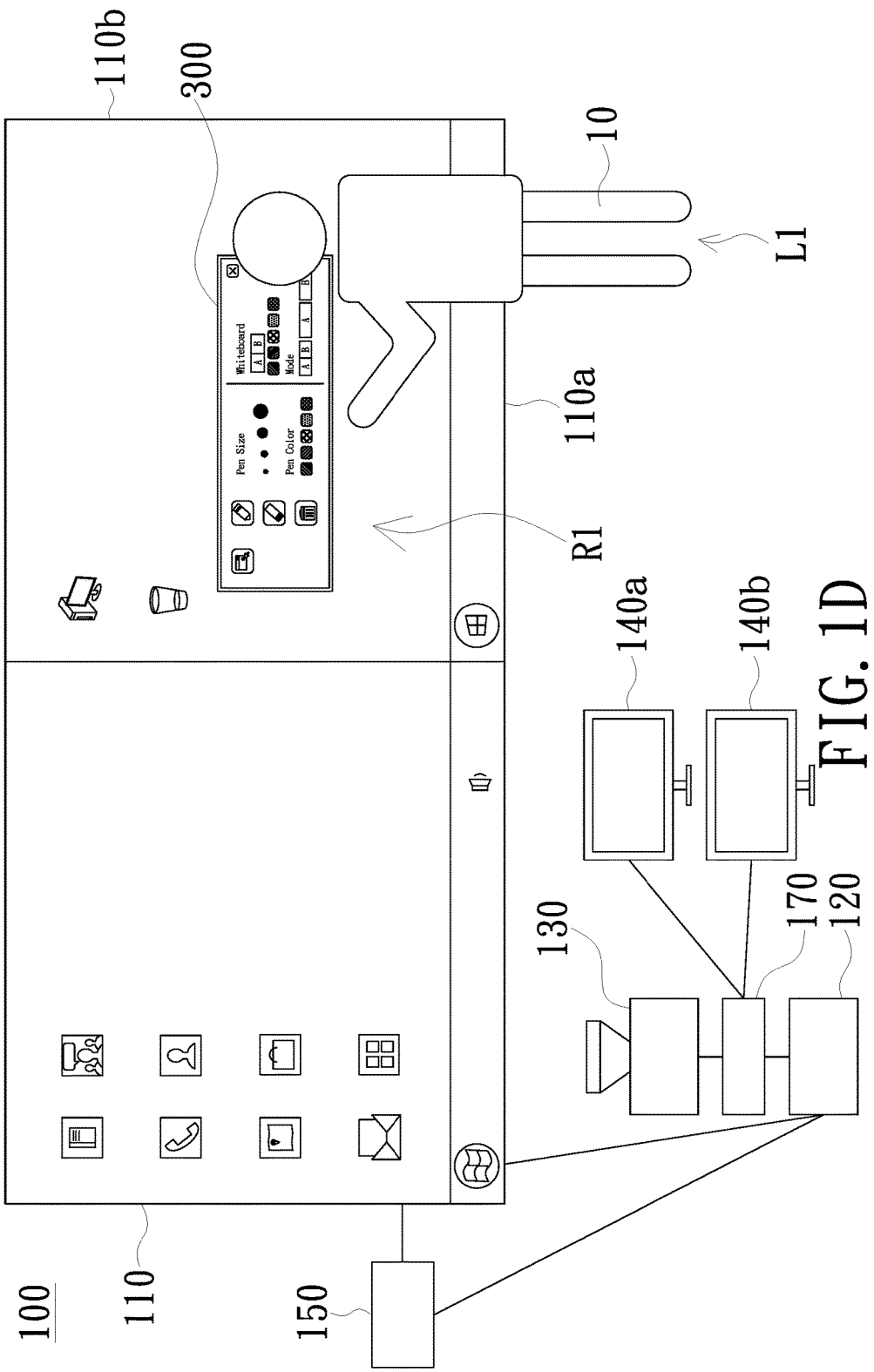

Referring to FIG. 1D, the processing unit 120 may drive the shortcut icon 200 according to the coordinate values and display the shortcut icon 200 on the touch screen 110 within a position adjacent to the long side 110a of the touch screen 110 in which the position is located under the first ending touch point 112 along a direction perpendicular to the long side 110a of the touch screen 110. In other words, x-coordinate values of the first ending touch point 112 and the shortcut icon 200 as defined by the processing unit 120 are identical, and the shortcut icon 200 may be, but not limited to, displayed directly below the first ending touch point 112.

It is apparent that the shortcut icon 200 displayed within the first area R1 of the touch screen 110 can be touched by the user 10 at the first location L1 so as to be activated. Consequently, upon the user 10 touching the shortcut icon 200, the shortcut icon 200 would disappear on the touch screen 110; that is, the shortcut icon 200 would not be displayed on the touch screen 110. Meanwhile, a menu interface 300 would be displayed in the first area R1 on the touch screen 110 for the user 10 at the first location L1 to touch and activate functions displayed by the menu interface 300 on the touch screen 110.

Figure 2:
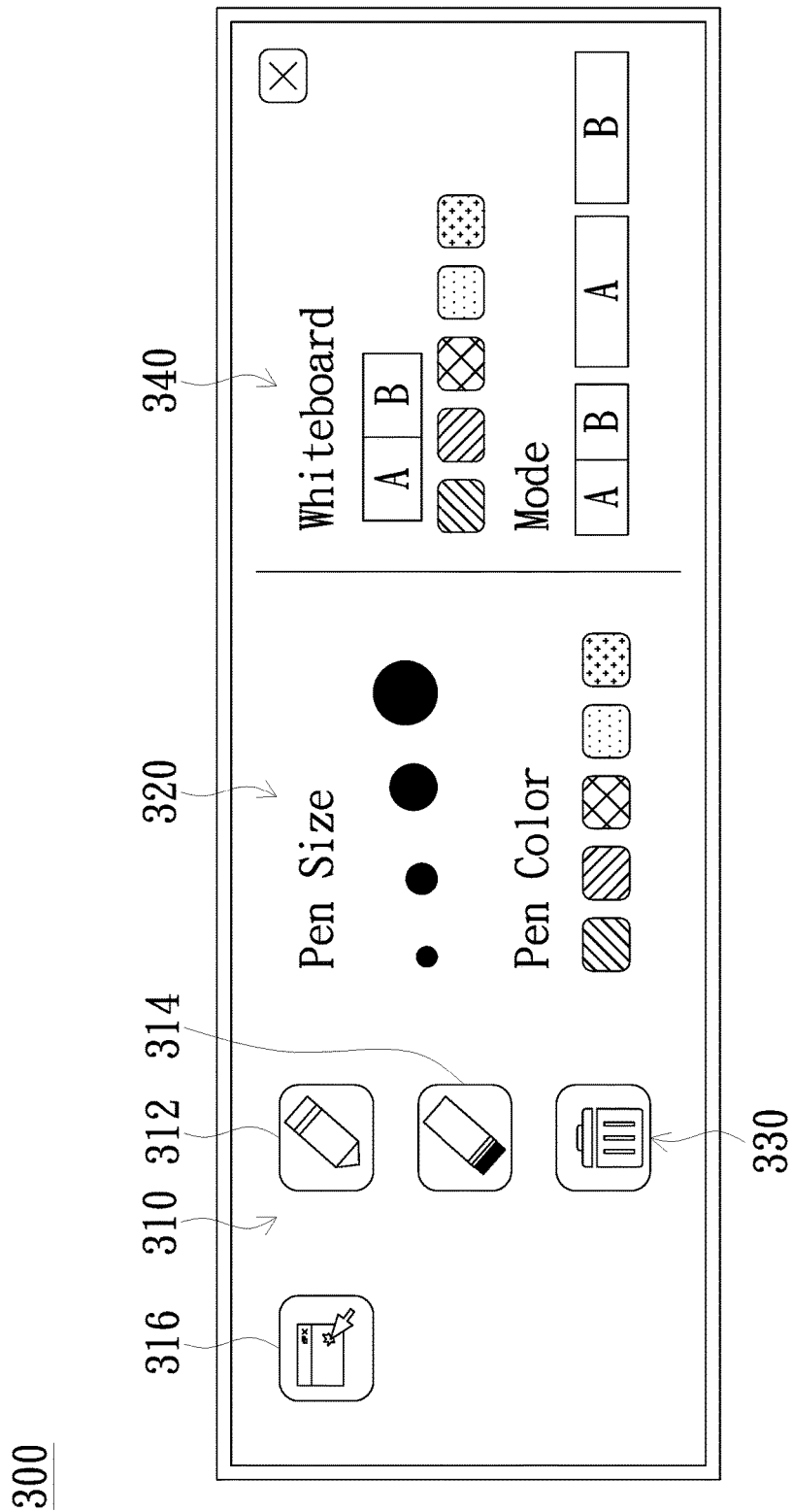
FIG. 2 illustrates a schematic view of a menu interface according to the embodiment of the invention.

Referring to FIG. 2, which illustrates the menu interface 300 according to the embodiment of the invention. As shown in FIG. 2, the menu interface 300 may include a tool menu 310, a drawing function menu 320, an image clearing menu 330, and an image switching menu 340. The user 10 can tap function icons in the tool menu 310, the drawing function menu 320, the image clearing menu 330, and the image switching menu 340 and activate the corresponding functions. For example, size and color of lines displayed during drawing or writing can be chosen by the user 10 tapping the function icons in the drawing function menu 320; images displayed on the touch screen 110 can be switched by the user 10 tapping the function icon corresponding to the image switching menu 340; and when a plurality of images from the image sources are displayable on the touch screen 110, the user 10 can tap the function icons in the image switching menu 340 to display images from different image sources on the touch screen 110 simultaneously, display images from a single image source on the touch screen 110, or directly display a whiteboard, so that the user may draw or write by selecting the function icons in the tool menu 310, the drawing function menu 320, and the image clearing menu 330.

More specifically, the tool menu 310 includes a plurality of function icons corresponding to different functions. For example, the function icons may include a pen icon 312, an eraser icon 314, and a cursor icon 316. Therefore, the user 10 may draw and write on the touch screen 110 by selecting the pen icon 312; the user 10 may erase patterns drawn or written on the touch screen 110 by selecting the eraser icon 314; and the user 10 may control cursor, and thus give instructions, on the touch screen 110 by selecting the cursor icon 310.

Additionally, an image displayed by the shortcut icon 200 on the touch screen 110 may also correspond to one of the function icons chosen by the user 10. For example, the user 10 may close the menu interface 300 and open the shortcut icon 200 upon the selecting the pen icon 312 at the menu interface 300 to draw and write. The image displayed by the shortcut icon 200 may be, but not limited to, identical to the pen icon 312 at the menu interface 300 (refer to FIG. 1A).

Referring to FIG. 1D, when the user 10 has completed all desired operations and wishes to close the menu interface 300, the user 10 may touch any position outside of the menu interface 300 on the touch screen 110, such that a close menu touch point signal is generated. Meanwhile, the detection unit 150 would detect the close menu touch point signal generated by the user 10 touching the touch screen 110 outside of the menu interface 300. Upon the detection unit 150 detecting the close menu touch point signal, the processing unit 120 would hide the menu interface 300 from the touch screen 110; that is, the menu interface 300 would not be displayed on the touch screen 110, so that the user 10 may perform desired actions around the touch screen 110, such as giving a presentation according to the images displayed on the touch screen 110. Additionally, after the menu interface 300 is hidden from the touch screen 110, the shortcut icon 200 would be immediately displayed in the first area R1 on the touch screen 110, as shown in FIG. 1C; and the image of the shortcut icon 200 displayed on the touch screen may be, but not limited to, identical to the image of the function icon chosen by the user 10 at the menu interface 300. In other embodiments, the shortcut icon 200 may be, but not limited to, displayed in an area on the touch screen 110 not interfering with the desired actions of the user 10, such as the location of the shortcut icon 200 shown in FIG. 1A.

Figure 1E:
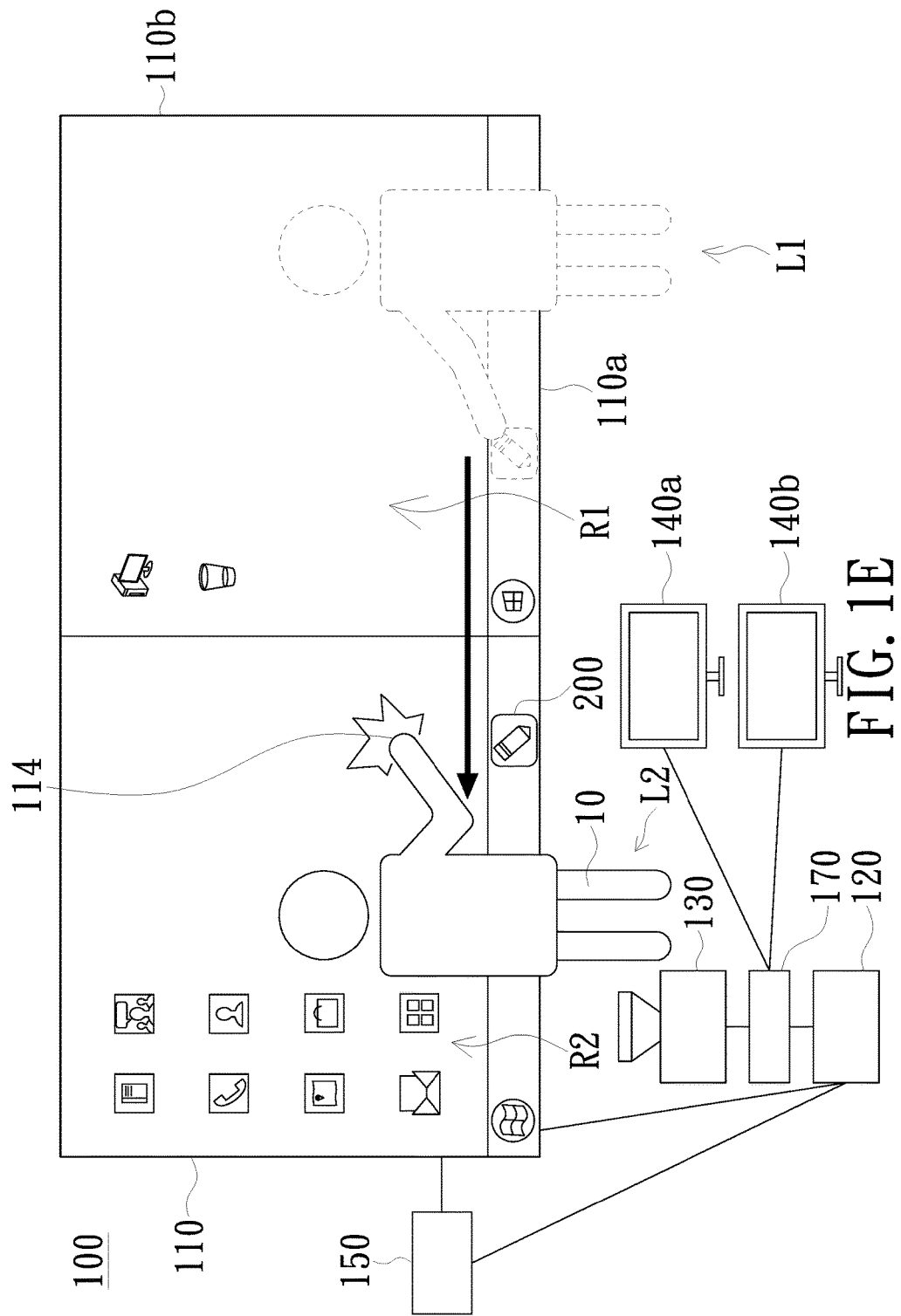

Referring now to FIG. 1E, when the shortcut icon 200 is firstly displayed in the first area R1 on the touch screen 110 and then the user 10 moves to a second location L2 and generates a second ending touch point 114 from the second location L2 by touching the sensing area of the touch screen 110, the detection unit 150 would detect the second ending touch point 114 and form a second ending touch point signal. Once the second ending touch point signal disappears, the shortcut icon 200 would move from the first area R1 to a second area R2 on the touch screen 110; that is the shortcut icon 200 would appear within the second area R2 according to the second ending touch point 114. The second area R2 is an area on the touch screen 110 touched by the user 10 at the second location L2. It is noted that the second position L2 is a position which the user 10 moves to from the first location L1. Additionally, the second ending touch point 114 is the last one of the touch points which the user 10 at the second location L2 touches on the sensing area of the touch screen 110 with a finger or an object operated by the user 10. For example, when a plurality of connecting touch points connected to each other are generated by the user 10 at the second location L2 touching the touch screen 110 continuously, the last one of the touch points may be defined as the second ending touch point 114.

Furthermore, upon the disappearance of the second ending touch point signal, the shortcut icon 200 would move on the touch screen 110 from a first position on the first area R1 to a second position on the second area R2 in which the first position is adjacent to the long side 110a of the touch screen 110 and the first position is located under the first ending touch point 112 along a direction perpendicular to the long side 110a of the touch screen 110, and the second position is adjacent to the long side 110a of the touch screen 110 and the second position is located under the second ending touch point 114 along the direction perpendicular to the long side 110a of the touch screen 110. In other words, when the user 10 moves from the first location L1 to the second location L2 and touches the touch screen 110 to generate the second ending touch point 114 after having generated the first ending touch point 112, the shortcut icon 200 may move on the touch screen 110 horizontally along the long side 110a from the first position directly below the first ending touch point 112 to the second position directly below the second ending touch point 114.

It is apparent that when the user 10 at the first location L1 touches the touch screen 110 at different time points and thus generates the first ending touch point 112 and the second ending touch point 114 respectively, the shortcut icon 200 would move on the touch screen 110 from the first position to the second position on the first area R1 of the touch screen 110. The first position is adjacent to the long side 110a of the touch screen 110 and the first position is located under the first ending touch point 112 along a direction perpendicular to the wide side 110a of the touch screen 110, and the second position is adjacent to the long side 110a of the touch screen 110 and the second position is located under the second ending touch point 114 along the direction perpendicular to the long side 110a of the touch screen 110; that is, the shortcut icon 200 would move on the touch screen 110 horizontally along the long side 110a from the first position directly below the first ending touch point 112 to the second position directly below the second ending touch point 114.

The touch-based interaction method of the embodiments of the invention enables the user to touch the shortcut icon on the touch screen and thus activate the menu interface conveniently from any location around the touch screen. When the touch screen is a large widescreen, such as screens over 100 inches, the user needs not move constantly to operate the control menu displayed at the sides of the touch screen for switching functions. Therefore, excellent convenience during interactive operations of the touch screen is provided.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A touch-based interaction method, comprising:
    detecting a first ending touch point signal generated when a user at a first location touches a first ending touch point on a touch screen;
    upon detection of a disappearance of the first ending touch point signal, displaying a shortcut icon on a first area on the touch screen, wherein the first area is an area on the touch screen touched by the user locating at the first location;
    upon the user touching the shortcut icon, hiding the shortcut icon from the touch screen, and then displaying a menu interface on the touch screen, wherein the menu interface is located in the first area;
    detecting a close menu touch point signal generated when the user touches the touch screen outside of the menu interface; and
    upon detection of the close menu touch point signal, hiding the menu interface from the touch screen.

2. The touch-based interaction method according to claim 1, further comprising:
    upon hiding of the menu interface from the touch screen, displaying the shortcut icon on the first area on the touch screen.

3. The touch-based interaction method according to claim 1, further comprising:
    projecting an image on the touch screen from at least one image source.

4. The touch-based interaction method according to claim 1, further comprising:
    upon the disappearance of the first ending touch point signal, displaying the shortcut icon on a position of the touch screen wherein the position is adjacent to a long side of the touch screen and the position is located under the first ending touch point along a direction perpendicular to the long side of the touch screen.

5. The touch-based interaction method according to claim 1, wherein when a plurality of connecting touch points are generated by the user touching the touch screen continuously wherein the connecting touch points are contacted with each other, defining the last one of the connecting touch points as the first ending touch point.

6. The touch-based interaction method according to claim 1, further comprising:
    detecting a second ending touch point signal generated when the user locating at a second location touches a second ending touch point on the touch screen; and
    upon detection of a disappearance of the second ending touch point signal, the shortcut icon moving from the first area to a second area on the touch screen, wherein the second area is an area on the touch screen touched by the user locating at the second location.

7. The touch-based interaction method according to claim 6, wherein upon the disappearance of the second ending touch point signal, the shortcut icon moves on the touch screen from a first position to a second position, the first position is adjacent to a long side of the touch screen and the first position is located under the first ending touch point along a direction perpendicular to the long side of the touch screen, and the second position is adjacent to the long side of the touch screen and the second position is located under the second ending touch point along the direction perpendicular to the long side of the touch screen.

8. The touch-based interaction method according to claim 1, further comprising:

detecting a second ending touch point signal generated when the user locating at a second location touches a second ending touch point on the touch screen; and upon the disappearance of the second ending touch point signal, the call interface moving on the touch screen from a first position to a second position, wherein the first position is adjacent to a long side of the touch screen and the first position is located under the first ending touch point along a direction perpendicular to the long side of the touch screen, and the second position is adjacent to the long side of the touch screen and the second position is located under the second ending touch point along the direction perpendicular to the long side of the touch screen.

9. The touch-based interaction method according to claim 1, wherein the menu interface comprises a tool menu, a drawing function menu, an image clearing menu, and an image switching menu.

10. The touch-based interaction method according to claim 9, wherein the tool menu comprises a plurality of function icons corresponding to a plurality of functions, an image displayed by the shortcut icon on the touch screen corresponds to one of the function icons chosen by the user.

11. The touch-based interaction method according to claim 10, wherein the function icons of the tool menu comprise a pen icon, an eraser icon, and a cursor icon.

12. The touch-based interaction method according to claim 1, wherein the touch screen is touched by a finger of the user or an object operated by the user.

* * * * *